United States Patent
Hartmann et al.

(10) Patent No.: US 11,459,724 B2
(45) Date of Patent: Oct. 4, 2022

(54) METHOD FOR PRODUCING A SEALING BASE IN THE GROUND

(71) Applicant: BAUER Spezialtiefbau GmbH, Schrobenhausen (DE)

(72) Inventors: Dominik Hartmann, Pfaffenhofen (DE); Albert Hartmann, Vilsbiburg (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 0 days.

(21) Appl. No.: 16/759,904

(22) PCT Filed: Sep. 10, 2019

(86) PCT No.: PCT/EP2019/074105
§ 371 (c)(1),
(2) Date: Apr. 28, 2020

(87) PCT Pub. No.: WO2020/098993
PCT Pub. Date: May 22, 2020

(65) Prior Publication Data
US 2021/0214911 A1    Jul. 15, 2021

(30) Foreign Application Priority Data
Nov. 12, 2018 (EP) .................................. 18205641

(51) Int. Cl.
*E02D 19/16* (2006.01)
*E02D 3/12* (2006.01)
(Continued)

(52) U.S. Cl.
CPC ............... *E02D 19/16* (2013.01); *E02D 3/12* (2013.01); *E02D 17/02* (2013.01); *E02D 31/12* (2013.01)

(58) Field of Classification Search
CPC ........... E02D 19/16; E02D 19/18; E02D 3/12; E02D 17/02; E02D 31/12
See application file for complete search history.

(56) References Cited

U.S. PATENT DOCUMENTS 3,690,106 A * 9/1972 Rhoderio .................. E02D 3/12
   405/266
4,877,358 A * 10/1989 Ressi di Cervia ........ E02D 5/18
   405/267
(Continued)

FOREIGN PATENT DOCUMENTS

DE     195 22 150 C1    10/1996
DE     196 04 525 C2     1/1998
(Continued)

OTHER PUBLICATIONS

International Search Report issued in PCT/EP2019/074105; dated Nov. 7, 2019.
(Continued)

*Primary Examiner* — Benjamin F Fiorello
(74) *Attorney, Agent, or Firm* — Studebaker & Brackett PC

(57) ABSTRACT

The invention relates to a method for producing a sealing base in the ground in which by injection of a curable grouting compound a plurality of sealing elements is produced in a first soil layer, which elements adjoin one another or overlap, wherein the plurality of sealing elements forms a solid base plate following curing of the grouting compound. It is provided according to the invention that in a second soil layer, which lies beneath the first soil layer for the solid base plate, a gel base is created by injection of a sealing gel, and that the solid base plate and the underlying gel base form the sealing base. The invention further relates to a correspondingly produced sealing base.

10 Claims, 1 Drawing Sheet

(51) Int. Cl.
*E02D 17/02* (2006.01)
*E02D 31/12* (2006.01)

(56) References Cited

U.S. PATENT DOCUMENTS

| | | | | |
|---|---|---|---|---|
| 4,908,129 | A * | 3/1990 | Finsterwalder | B09B 1/00 |
| | | | | 210/170.07 |
| 5,180,255 | A * | 1/1993 | Alexander | E04C 2/528 |
| | | | | 405/229 |
| 7,565,779 | B2 * | 7/2009 | Iske | E21D 11/381 |
| | | | | 52/742.13 |
| 9,988,784 | B2 * | 6/2018 | Barron | E02D 5/34 |
| 2002/0098042 | A1 * | 7/2002 | Canteri | E02D 3/12 |
| | | | | 405/40 |
| 2006/0191224 | A1 * | 8/2006 | Iske | E02D 19/18 |
| | | | | 52/415 |
| 2010/0135731 | A1 * | 6/2010 | Barron | E02D 3/12 |
| | | | | 405/263 |
| 2013/0196061 | A1 * | 8/2013 | Hull | C04B 28/021 |
| | | | | 427/180 |
| 2016/0312429 | A1 * | 10/2016 | Arima | E02D 3/12 |
| 2018/0313055 | A1 * | 11/2018 | Ames | E02D 31/004 |
| 2020/0190760 | A1 * | 6/2020 | Pastor | E02D 3/123 |

FOREIGN PATENT DOCUMENTS

| | | | |
|---|---|---|---|
| DE | 197 52 180 C1 | 7/1999 | |
| DE | 102004040189 A1 * | 4/2006 | E02D 19/16 |
| DE | 102 18 771 B4 | 6/2006 | |
| EP | 0 918 110 A1 | 5/1999 | |
| EP | 2 787 123 B1 | 8/2015 | |

OTHER PUBLICATIONS

International Preliminary Report on Patentability and Written Opinion issued in PCT/EP2019/074105; dated May 11, 2021.

* cited by examiner

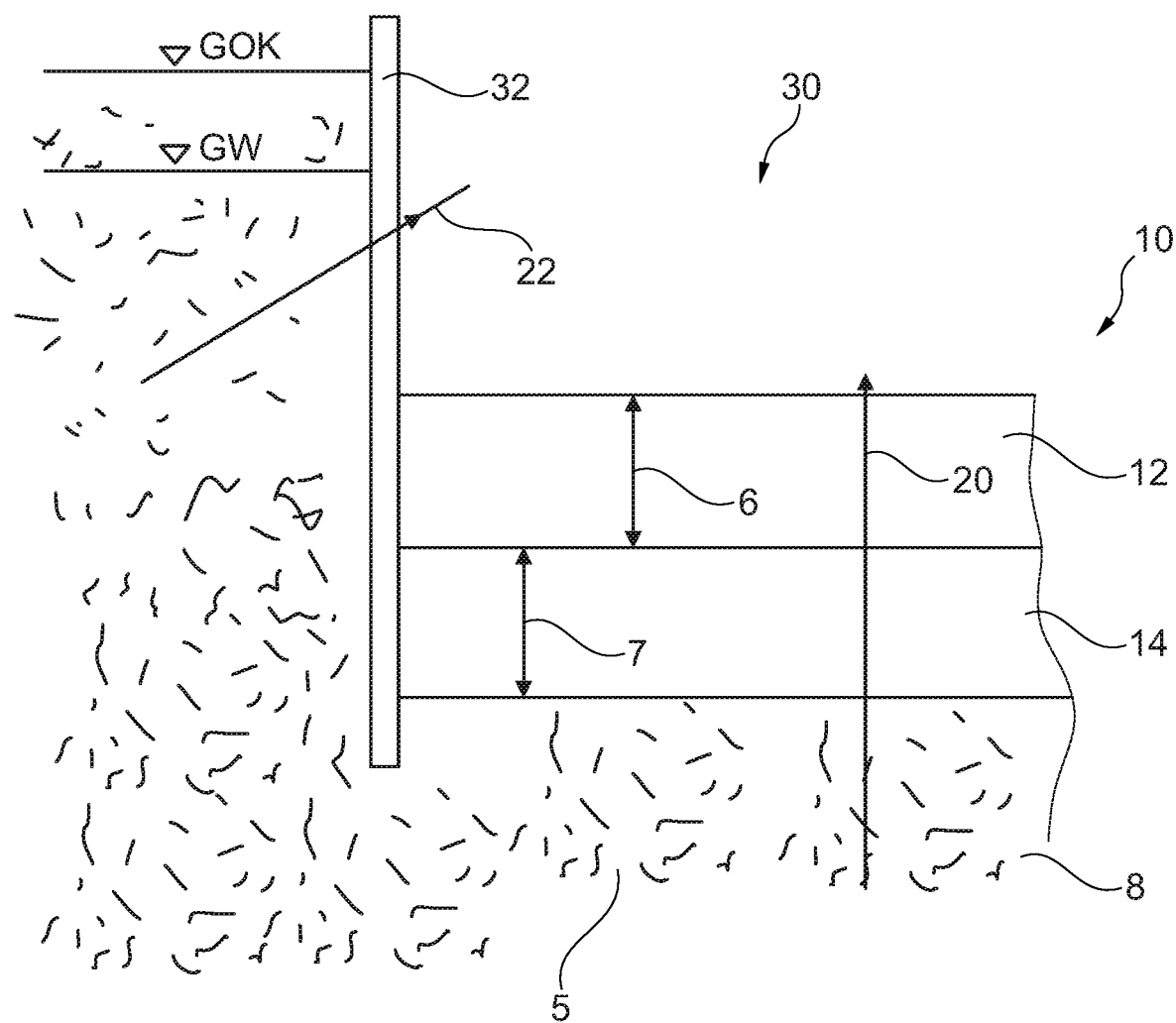

METHOD FOR PRODUCING A SEALING BASE IN THE GROUND

The invention relates to a method for producing a sealing base in the ground, in which by injection of a curable grouting compound a plurality of sealing elements is produced in a first soil layer, which elements adjoin one another or overlap, wherein the plurality of sealing elements forms a solid base plate following curing of the grouting compound.

The invention further relates to a sealing base in the ground, wherein in a first soil layer a plurality of sealing elements made of a curable grouting compound is produced, which elements adjoin one another or overlap and thereby form a solid base plate.

Such sealing bases are used in particular when sealing deep excavation pits, which may have a depth of 15 m or more. If such an excavation pit is excavated, a relatively high water pressure is often present at the bottom of the excavation pit on account of the existing groundwater level. It is to be ensured by a sealing base that no water can enter the excavation pit on the one hand and on the other hand the bottom of the excavation pit as a whole is not pressed upwards by the water pressure that exists.

It is known from the documents DE 197 52 180 C1 and DE 196 04 525 C2 to create a solid base plate from a plurality of sealing elements of a curable grouting compound. In a jet grouting process, also termed HDI process, disc-shaped or spherical sealing elements are produced in a predetermined grid in a first soil layer, which elements adjoin one another and thus form a solid base plate following curing of the grouting compound. This base plate can be anchored in lower-lying soil layers by way of anchor elements so that this base plate withstands the existing groundwater pressure.

Sealing bases of this kind are also described as high-lying sealing bases, as they can be formed directly on the bottom of an excavation pit. This has the advantage that adjacent walls for an excavation pit enclosure must only have a depth that corresponds approximately to the depth of the excavation pit.

In the case of such high-lying sealing bases with a solid base plate, however, adequate tightness must be ensured in a generally elaborate manner. For this reason the sealing elements that form the solid base plate are formed with a certain overlap. The greater the degree of overlap, the greater the security against untight places. A greater degree of overlap also signifies increased work input and material expenditure, however, which in the case of large sealing bases in particular leads to considerable cost increases. In addition, the arrangement of anchoring elements that penetrate the solid base plate can also pose a problem for tightness. Additional sealing measures may thus become necessary in the area of the passage of the anchoring elements through the base plate.

Furthermore, so-called low-lying sealing bases exist in which an impermeable horizontal soil layer is produced in a lower soil layer by injecting a sealing gel before digging an excavation pit. In a sand or gravel layer, for instance, the sealing gel closes the interstices between the grains of sand or aggregate. Since such a sealing base produced by sealing gel does not form a solid base plate that could be anchored downwards, a defined soil layer must remain above this "soft" sealing base. This loading soil layer, which may have a thickness of several meters, is thus located between the sealing base and the bottom of the pit to be excavated, as is known for instance from EP 2 787 123 B1 or DE 102 18 771 B4.

Good sealing can be achieved by such a low-lying sealing base. It is disadvantageous, however, that the walls of the excavation pit enclosure must be executed considerably deeper than the depth of the excavation pit so that the excavation pit enclosure reaches as far as the low-lying sealing base. Low-lying sealing bases with a sealing gel are therefore associated with a considerably higher outlay to produce the walls for an excavation pit enclosure.

The object of the invention is to specify a method for producing a sealing base in the ground and to specify a sealing base with which both a good seal and efficient production are facilitated.

The object is achieved according to the invention by the claimed method and by a sealing base with the claimed features. Preferred embodiments of the invention are indicated in the dependent claims.

The method according to the invention is characterized in that in a second soil layer, which lies beneath the first soil layer for the solid base plate, a gel base is produced by injection of a sealing gel, and in that the solid base plate and the gel base lying thereunder form the sealing base.

A basic idea of the invention consists in combining a solid base plate of a high-lying sealing base with a gel base of a low-lying sealing base. Due to the solid base plate, the sealing base according to the invention can be produced as a high-lying sealing base, which can be formed with or without a relatively small load. The solid base plate preferably directly forms the bottom of an excavation pit to be created.

By arranging a gel base beneath the base plate, a high tightness of the sealing base according to the invention is achieved. The sealing elements necessary to produce the solid base plate can be formed due to this with a relatively small or ideally no overlap. The possible interstices resulting here, which may arise due to variations during production of the sealing elements, are reliably sealed against an ingress of water by the gel base lying underneath. At the same time, the solid base plate can guarantee adequate stability against the base of the excavation pit being pushed upwards. According to the invention, the sealing base can be arranged directly under the solid base plate and adjoin this or be formed with a certain intermediate spacing, so that soil material is still located between the underside of the base plate and the top side of the gel base.

As a result, due to the sealing base produced according to the invention, the advantage of a high-lying sealing base can be achieved with a reduced outlay in production of the sealing elements with high tightness at the same time due to the underlying gel base.

It is particularly preferred according to a further development of the invention that the base plate is anchored in underlying soil layers by anchoring means. The anchoring means can be in particular tie rods or tension piles, which are connected in a suitable manner to the solid base plate. In their lower area the anchoring means can be formed as HDI anchors, for example, which are connected to the underlying soil layers. Lifting forces on the sealing base can thus be dissipated into underlying soil layers via the anchoring means.

The gel base and the base plate can basically be produced in any way in a time respect. Thus, the base plate can be produced first or simultaneously with the gel base. From a manufacturing technology viewpoint, however, it is particularly advantageous that first the gel base and then the base plate is produced. The gel base and the base plate can be produced in this case using the same grouting device, in particular a drillable grouting lance, or with separate grouting devices.

In principle any suitable curable compound can be used to produce the solid base plate. According to a further development of the invention, it is particularly expedient to use a suspension containing cement, in particular a cement-bentonite suspension, as a curable compound. Such a suspension can be introduced particularly efficiently using a jet grouting method, in which a grouting lance is moved in a rotatory manner in a soil layer. The additional of a bentonite component also leads to an increased degree of tightness of the solid base plate.

Another preferred implementation variant of the invention consists in injecting the curable grouting compound and/or the sealing gel by means of a grouting lance, which is introduced into the ground as far as the predetermined soil layer. The introduction can take place in particular by boring. For the introduction a high-pressure grouting method can be used in particular, in which the suspension to be injected is injected at pressures of 20 bar and above.

It is particularly preferred furthermore that the sealing gel contains silicate, water glass and/or silica sol as components. The grouting medium consists particularly preferably in this case of up to 80% water, 10% water glass, 10 to 30% silica sol and 0.1 to 3% complexing agents. The percentages here refer to percent by weight. Silica sol can be understood in particular as an aqueous solution of colloidal silicates. It is especially advantageous in particular if the gel base is created with a neutral pH value or a pH value that largely corresponds to the pH value of the surrounding soil layer. To produce the gel base according to the invention, however, other suitable sealing gels can also be used accordingly.

In suitable conditions a sealing base alone can generally be produced without the creation of an excavation pit enclosure, for instance if adjacent rock regions exist. It is particularly expedient according to a further development of the invention that to form an excavation pit enclosure, a vertical enclosure wall is created at which the sealing base adjoins. In this case the sealing base preferably lies inside the enclosure wall.

The enclosure wall can be formed of bored pile walls, diaphragm walls or also by suitable sheet piles. According to the invention, the sealing base is normally produced first and then the enclosure walls for the excavation pit enclosure. The excavation pit can then be excavated as far as the envisaged excavation pit bottom, in particular down to the solid base plate.

The sealing base according to the invention is characterized in that in a second soil layer, which lies beneath the first soil layer for the solid base plate, a gel base is produced using a sealing gel and that the solid base plate and the gel base lying thereunder form the sealing base.

The sealing base according to the invention is produced in particular using a method according to the invention as described previously. The sealing base according to the invention yields the advantages described previously in connection with the production method according to the invention.

According to a further development of the invention, it is particularly advantageous that the base plate is anchored in underlying soil layers by anchoring means. The anchoring means can preferably be tie rods or tension piles.

The invention further comprises an excavation pit enclosure with an approximately vertical enclosure wall, wherein a sealing base according to the invention is formed inside the enclosure wall.

The invention is explained further below by means of a preferred exemplary embodiment that is depicted schematically in the single drawing of FIG. 1.

FIG. 1 is a partial sectional view of a sealing base according to the invention.

In the partial sectional view in the single drawing, an excavation pit enclosure 30 with a vertical enclosure wall 32 and a sealing base 10 according to the invention is formed in ground 5. The ground here has a ground top surface GOK and a groundwater level GW.

Prior to excavation of the pit, a substantially horizontal base plate 12 is first created in a first soil layer 6 by injection of a curable compound. Here boreholes are introduced in a predetermined grid into the first soil layer 6, a curable compound then being generated by means of grouting lances, which are not depicted, to produce a disc-shaped sealing element around the approximately vertical grouting borehole. The diameter of the disc-like sealing element is set in such a manner to the grid that the individual sealing elements contact one another and in particular overlap in a defined manner. The grouting compound cures after a certain time, so that a solid base plate 12 as a whole is produced, which can also be described as a static base.

Following or preceding this, a gel base 14 can be produced in a corresponding manner in a second soil layer 7, which lies beneath the first soil layer 6, by injecting a sealing gel using grouting lances. The fluid sealing gel can penetrate here into the interstices in the aggregate in the second soil layer 7 and then turn into a gel-like structure. The second soil layer 7 is made into liquid-blocking layer by this and can thus constitute the gel base 14. The gel base 14 can also be described as an intrinsically sealing base.

The solid base plate 12 produced in this way with the underlying soft gel base 14 forms the sealing base 10 according to the invention, which thus constitutes a combination of two bases.

The solid base plate 12 can be anchored if necessary in underlying soil layers 8 that lie beneath the first soil layer 6 and the second soil layer 7 by anchoring means 20, in particular tension piles or tie rods.

Following the creation of the sealing base 10 according to the invention, suitable wall elements can be produced in the ground to form a vertical enclosure wall 32. The enclosure wall 32 is closed, in particular ring-shaped, around the sealing base 10. The annular, approximately vertical enclosure wall 32 and the adjoining approximately horizontal sealing base 10 form an excavation pit enclosure 30. Following completion of the excavation pit enclosure 30, the soil material inside the enclosure wall 32 can be excavated to produce an excavation pit as far as the top side of the base plate 12.

The invention claimed is:

1. Method for producing a sealing base in the ground,
in which by injection of a curable grouting compound a plurality of sealing elements is produced in a first soil layer, which elements adjoin one another or overlap, wherein the plurality of sealing elements forms a solid base plate following curing of the grouting compound,
characterized in that
in a second soil layer, which lies beneath the first soil layer for the solid base plate, a gel base is created by injection of a sealing gel, the sealing gel being a flowable aqueous solution, the solid base plate and the underlying gel base form the sealing base, the solid base plate is anchored in underlying soil layers by an anchoring means, and the sealing gel is introduced into the second soil layer using one or more grouting lances.

2. Method according to claim 1, characterized in that first the gel base and then the base plate is created.

3. Method according to claim 1, characterized in that a suspension containing cement is used as a curable compound.

4. Method according to claim 3, wherein the suspension containing cement is a cement-bentonite suspension.

5. Method according to claim 1, characterized in that the curable grouting compound is injected by means of a grouting lance, which is introduced into the ground as far as the envisaged soil layer.

6. Method according to claim 1, characterized in that the sealing gel contains silicate, water glass and/or silica sol as components.

7. Method according to claim 1, wherein the sealing gel is injected into the second soil layer after the grouting compound is injected into the first soil layer.

8. Method according to claim 1, characterized in that to form an excavation pit enclosure, an approximately vertical enclosure wall is created, at which the sealing base adjoins.

9. Excavation pit enclosure with an approximately vertical enclosure wall, characterized in that inside the enclosure wall there is formed a sealing base by the method according to claim 8.

10. Sealing base in the ground, produced by the method according to claim 1, wherein in a first soil layer a plurality of sealing elements made from a curable grouting compound is created, which elements adjoin one another or overlap and form a solid base plate thereby, characterized in that in a second soil layer, which lies beneath the first soil layer for the solid base plate, a gel base is created using a sealing gel, the sealing gel being a flowable aqueous solution, the solid base plate and the underlying gel base form the sealing base, the solid base plate is anchored in underlying soil layers by an anchoring means, and the sealing gel is introduced into the second soil layer using one or more grouting lances.

\* \* \* \* \*